(12) United States Patent
Kikuchi

(10) Patent No.: US 10,477,198 B2
(45) Date of Patent: Nov. 12, 2019

(54) DISPLAY CONTROL METHOD AND SYSTEM FOR EXECUTING THE DISPLAY CONTROL METHOD

(71) Applicant: COLOPL, Inc., Tokyo (JP)

(72) Inventor: Eita Kikuchi, Tokyo (JP)

(73) Assignee: COLOPL, INC., Tokyo (JP)

(*) Notice: Subject to any disclaimer, the term of this patent is extended or adjusted under 35 U.S.C. 154(b) by 0 days.

(21) Appl. No.: 15/481,593

(22) Filed: Apr. 7, 2017

(65) Prior Publication Data

US 2017/0295363 A1 Oct. 12, 2017

(30) Foreign Application Priority Data

Apr. 8, 2016 (JP) ................................. 2016-078176

(51) Int. Cl.
*H04N 13/172* (2018.01)
*H04N 13/398* (2018.01)
*H04N 13/344* (2018.01)
*H04N 13/383* (2018.01)
*H04N 13/183* (2018.01)

(52) U.S. Cl.
CPC ......... *H04N 13/398* (2018.05); *H04N 13/172* (2018.05); *H04N 13/183* (2018.05); *H04N 13/344* (2018.05); *H04N 13/383* (2018.05)

(58) Field of Classification Search
CPC ........... H04N 13/0497; H04N 13/0062; H04N 13/044; H04N 13/0484
See application file for complete search history.

(56) References Cited

U.S. PATENT DOCUMENTS

| 6,351,261 B1 | 2/2002 | Reichlen et al. |
| 2010/0111501 A1 | 5/2010 | Kashima |
| 2013/0194305 A1 | 8/2013 | Kakuta et al. |

(Continued)

FOREIGN PATENT DOCUMENTS

| CN | 101729781 A | 6/2010 |
| CN | 105210379 A | 12/2015 |

(Continued)

OTHER PUBLICATIONS

Office Action in JP Application No. 2016-078176, dated Oct. 4, 2016.

(Continued)

*Primary Examiner* — Joseph W Becker
(74) *Attorney, Agent, or Firm* — Hauptman Ham, LLP

(57) ABSTRACT

A display control method with which a captioned image can be displayed in the visual field of a user irrespective of a change in the line-of-sight direction of the user. The display control method includes a step of generating visual-field image data, which represents a visual-field image, based on the line-of-sight direction of a user and 360-degree space image data. The method further includes a step of receiving captioned image data, which represents a captioned image. The method further includes a step of displaying on an HMD a composite image of the visual-field image and from the captioned image, based on the visual-field image data and the captioned image data. The composite image is displayed is displayed at a given place in the visual-field image irrespective of a change in the line-of-sight direction of the user.

13 Claims, 9 Drawing Sheets

(56) References Cited

U.S. PATENT DOCUMENTS

| | | | | |
|---|---|---|---|---|
| 2015/0163473 | A1* | 6/2015 | Osawa | H04N 13/044 348/53 |
| 2016/0080650 | A1 | 5/2016 | Okazawa et al. | |
| 2017/0023793 | A1* | 1/2017 | Shtukater | G02B 27/0179 |

FOREIGN PATENT DOCUMENTS

| | | |
|---|---|---|
| JP | H7-24141 A | 1/1995 |
| JP | 7-85316 A | 3/1995 |
| JP | 2005-38008 A | 2/2005 |
| JP | 2009-294372 A | 12/2009 |
| JP | 2011-101196 A | 5/2011 |
| JP | 2012-48597 A | 3/2012 |
| JP | 2012-205191 A | 10/2012 |
| JP | 2014-17776 A | 1/2014 |

OTHER PUBLICATIONS

Decision to Grant a Patent in JP Application No. 2016-078176, dated Jan. 17, 2017.
International Search Report in PCT/JP2017/014004, dated Jun. 20, 2017. 5pp.
Office Action in CN Application No. 201780008767.0, dated Mar. 28, 2019, 9pp.

\* cited by examiner

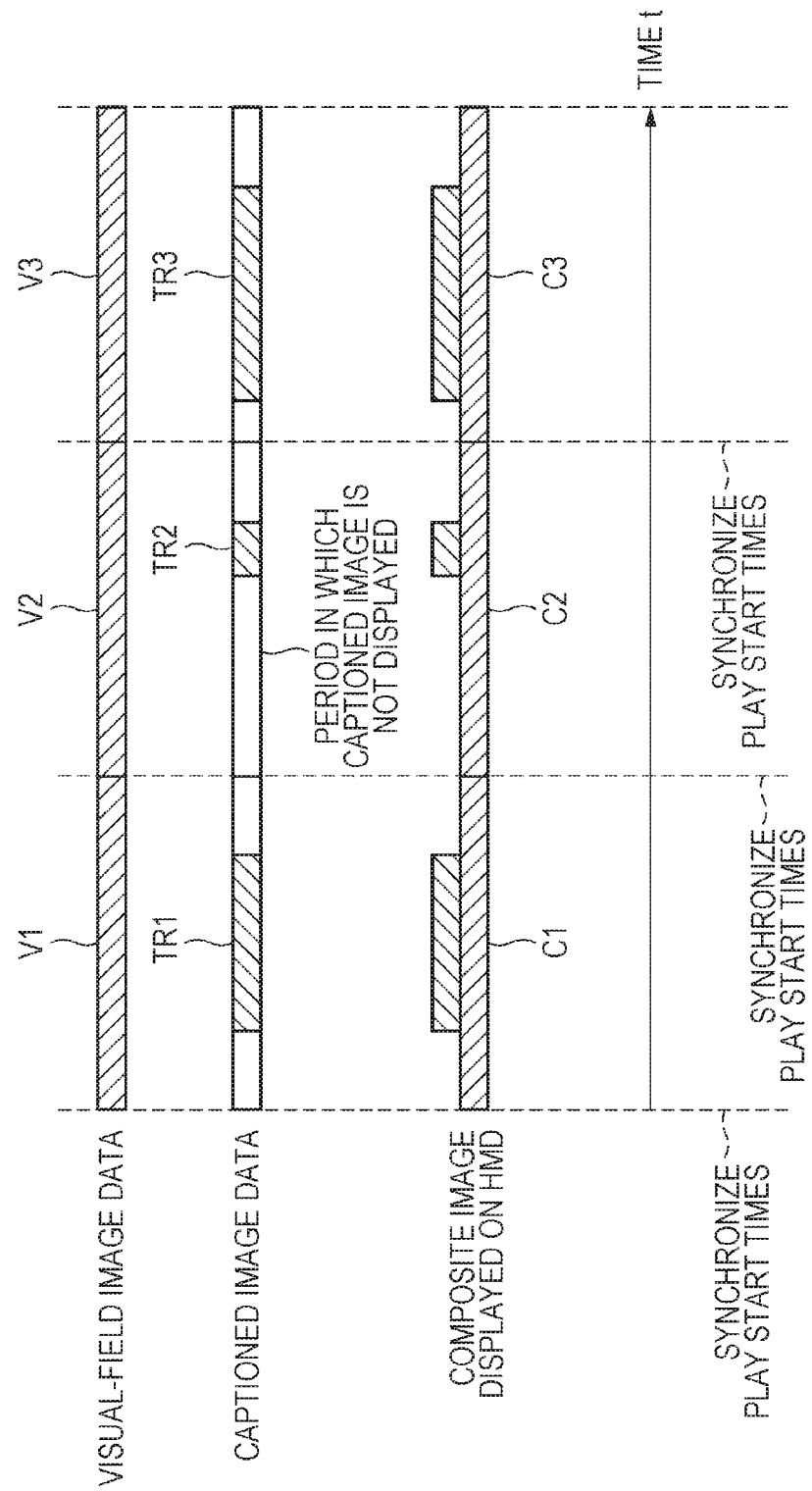

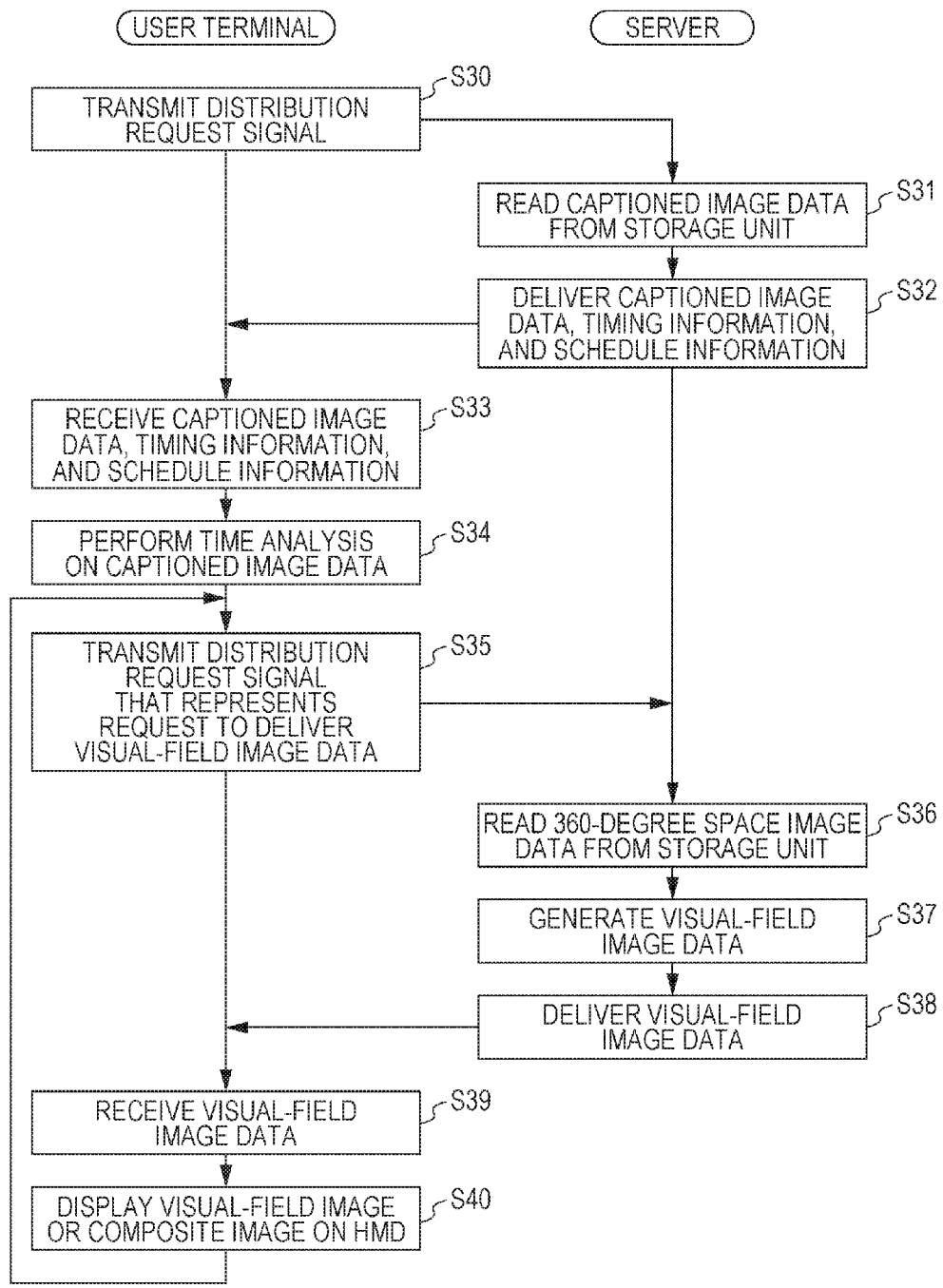

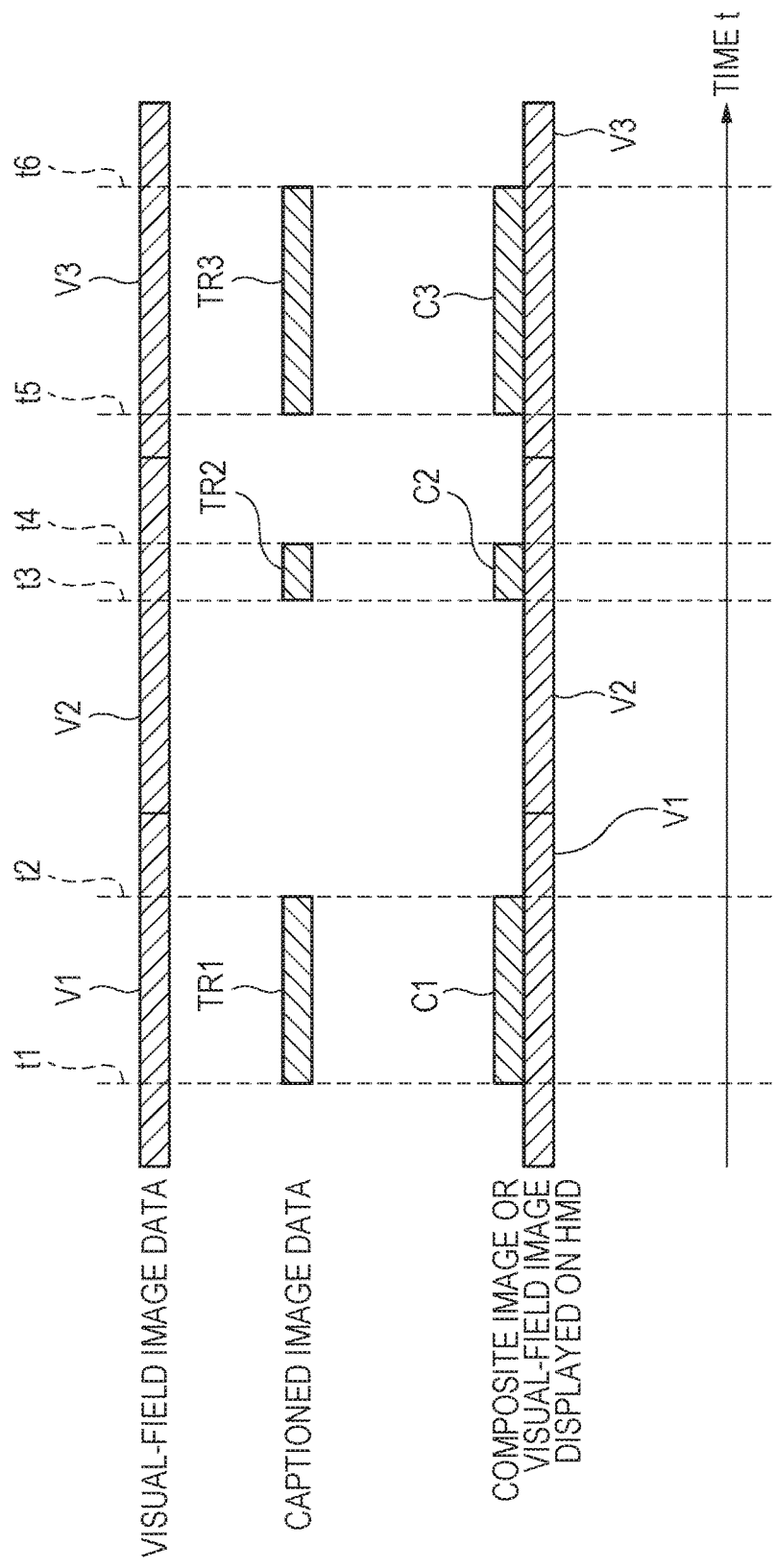

DISPLAY CONTROL METHOD AND SYSTEM FOR EXECUTING THE DISPLAY CONTROL METHOD

RELATED APPLICATIONS

The present application claims priority to Japanese Application Number 2016-078176, filed Apr. 8, 2016, the disclosure of which is hereby incorporated by reference herein in its entirety.

BACKGROUND

This disclosure relates to a display control method and a system for executing the display control method.

A head-mounted display (HMD), which is worn on the head of a user and is capable of displaying a virtual space image as a virtual reality (VR) space. Japanese Patent Application Laid-open No. 2005-038008, describes displaying annotation information about a virtual object that is displayed on an HMD and that has been stared at by the user for a fixed period of time.

With the technology disclosed in Japanese Patent Application Laid-open No. 2005-038008, however, the user cannot view the annotation information once the annotation information goes out of the user's visual field due to the movement of the HMD.

SUMMARY

An object of at least one embodiment of this disclosure to provide a display control method with which a captioned image can be displayed in the visual field of a user irrespective of a change in the line-of-sight direction of the user. An object of at least one embodiment of this disclosure is to provide a system for executing the display control method.

A display control method according to at least one embodiment of this disclosure includes a step of generating visual-field image data, which represents a visual-field image, based on a line-of-sight direction of a user and 360-degree space image data. The method further includes a step of receiving captioned image data, which represents a captioned image. The method further includes a step of displaying on a head-mounted display a composite image composited from the visual-field image and the captioned image, based on the visual-field image data and the captioned image data.

The step of displaying the composite image on the head-mounted display includes displaying the composite image so that the captioned image is displayed at a given place in the visual-field image irrespective of a change in the line-of-sight direction of the user.

According to at least one embodiment of this disclosure, the display control method is able to display the captioned image in the visual field irrespective of a change in the line-of-sight direction of the user.

BRIEF DESCRIPTION OF THE DRAWINGS

FIG. 4A and FIG. 4B are flowcharts of a display control method according to at least one embodiment of this disclosure, in which FIG. 4A is a flow chart of the display control method in a case where the content server delivers visual-field image data to the user terminal, and FIG. 4B is a flow chart of the display control method in a case where the content server delivers 360-degree space image data to the user terminal.

FIG. 5 is a timing chart of a display control method according to at least one embodiment.

FIG. 6A and FIG. 6B are flowcharts of a display control method according to at least one embodiment of this disclosure, in which FIG. 6A is a flow chart of the display control method in the case where the content server delivers visual-field image data to the user terminal, and FIG. 6B is a flow chart of the display control method in the case where the content server delivers 360-degree space image data to the user terminal.

FIG. 7 is a timing chart of a display control method according to at least one embodiment.

DETAILED DESCRIPTION

Figure 1:
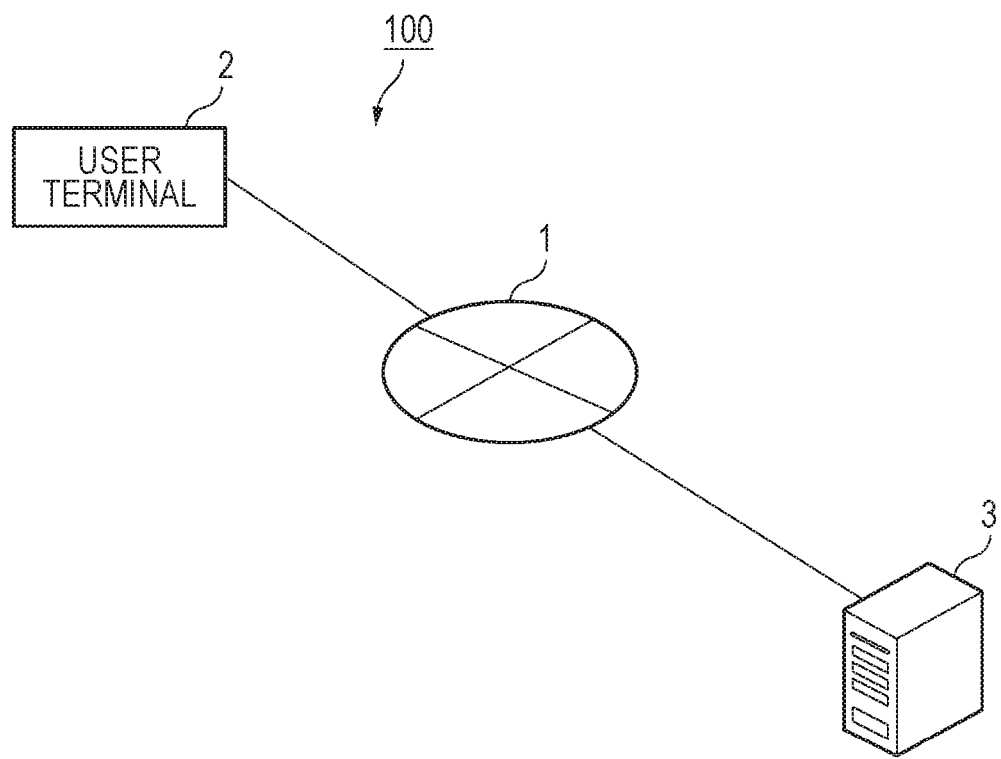
FIG. 1 is a diagram of a video content distributing system according to at least one embodiment.

A description of some of the embodiments of this disclosure is described.

(1) A display control method includes a step of generating visual-field image data, which represents a visual-field image, based on a line-of-sight direction of a user and 360-degree space image data. The method further includes a step of receiving captioned image data, which represents a captioned image. The method further includes a step of displaying on a head-mounted display a composite image composited from the visual-field image and the captioned image, based on the visual-field image data and the captioned image data. Displaying the composite image on the head-mounted display includes displaying the composite image so that the captioned image is displayed at a given place in the visual-field image irrespective of a change in the line-of-sight direction of the user.

According to at least one embodiment of the method described above, the composite image is displayed on the head-mounted display so that the captioned image is displayed at a given place in the visual-field image irrespective of a change in the line-of-sight direction of the user. The display control method with which the captioned image can be displayed in the user's visual field irrespective of a change in the user's line-of-sight direction is thus provided.

(2) A display control method according to Item (1), further including a step of receiving the 360-degree space image data from the server. Generating the visual-field image includes generating the visual-field image data by a user terminal.

According to at least one embodiment of the method described above, the user terminal generates the visual-field image data, which eliminates or reduces receiving the visual-field image data from the server every time there is a change in the line-of-sight direction of the user. This method is thus advantageous when the user's line-of-sight direction changes frequently.

(3) A display control method according to Item (1), wherein generating the visual-field image includes generating the visual-field image data by the server. The method further includes a step of receiving the visual-field image data from the server.

According to at least one embodiment of the method described above, instead of the 360-degree space image data, which is large in data size, the visual-field image data is transmitted from the server. As a result, the load of communication between the server and the user terminal can be reduced.

(4) A display control method according to any one of Items (1) to (3), in which displaying the composite image on the head-mounted display includes displaying the composite image by synchronizing a play start time of the visual-field image and a play start time of the captioned image.

According to at least one embodiment of the method described above, the composite image is displayed on the head-mounted display by synchronizing the play start time of the visual-field image data and the play start time of the captioned image data. Displaying the captioned image in the visual-field image is thus accomplished by a relatively simple principle.

(5) A display control method according to any one of Items (1) to (3), generating the visual-field image date is performed after receiving the captioned image data. Receiving the captioned image data includes receiving multiple pieces of the captioned image data simultaneously. Receiving the captioned image date includes receiving timing information, which indicates when to display the captioned image in the viewing image field. Displaying the composite image on the head-mounted display includes displaying the composite image based on the timing information, the visual-field image data, and the captioned image data.

According to at least one embodiment of the method described above, the composite image is displayed on the head-mounted display based on the timing information, the visual-field image data, and the captioned image data. As a result, displaying the captioned image in the visual-field image at a proper timing is accomplished with ease.

(6) A display control method according to Item (5), in which receiving the captioned image data includes receiving schedule information, which indicates, for each of pieces of the visual-field image data, or pieces of the 360-degree space image data, which are created by time division, a time to start receiving the each of pieces. The method further includes at least one of a step of receiving the 360-degree space data from the server based on the schedule information; or a step of receiving the visual-field image data from the server based on the schedule information. Displaying the composite image on the head-mounted display includes displaying the composite image based on the timing information, the schedule information, the visual-field image data, and the captioned image data.

According to at least one embodiment of the method described above, one of the visual-field image data and the 360-degree space image data is received based on the schedule information, and the composite image is displayed on the head-mounted display based on the timing information, the schedule information, the visual-field image data, and the captioned image data. As a result, displaying the captioned image in the visual-field image at a proper timing is accomplished with ease.

(7) A system for executing the display control method of any one of Items (1) to (6).

According to the above-mentioned item, providing a system with which the captioned image can be displayed in the visual field of a user irrespective of a change in the line-of-sight direction of the user is possible.

Some embodiments of this disclosure are described below with reference to the drawings. Once a component is described in this description of some of the embodiments, a description of a component having the same reference number as that of the already described component is omitted for the sake of convenience.

FIG. 1 is a block diagram of a video content distribution system 100 according to at least one embodiment. In FIG. 1, the video content distribution system 100 includes a plurality of user terminals 2, only one terminal 2 is including in FIG. 1 for clarity, on which video content can be viewed and a content server 3. Each user terminal 2 and the content server 3 are connected to each other via a communication network 1, which is a local area network (LAN), a wide area network (WAN), or the Internet, to facilitate communication between the user terminals and the server. In FIG. 1, one user terminal 2 and one content server 3 are shown to simplify the description. However, in at least one embodiment, a plurality of user terminals 2 and a plurality of content servers 3 may be connected to the communication network 1.

Figure 2:
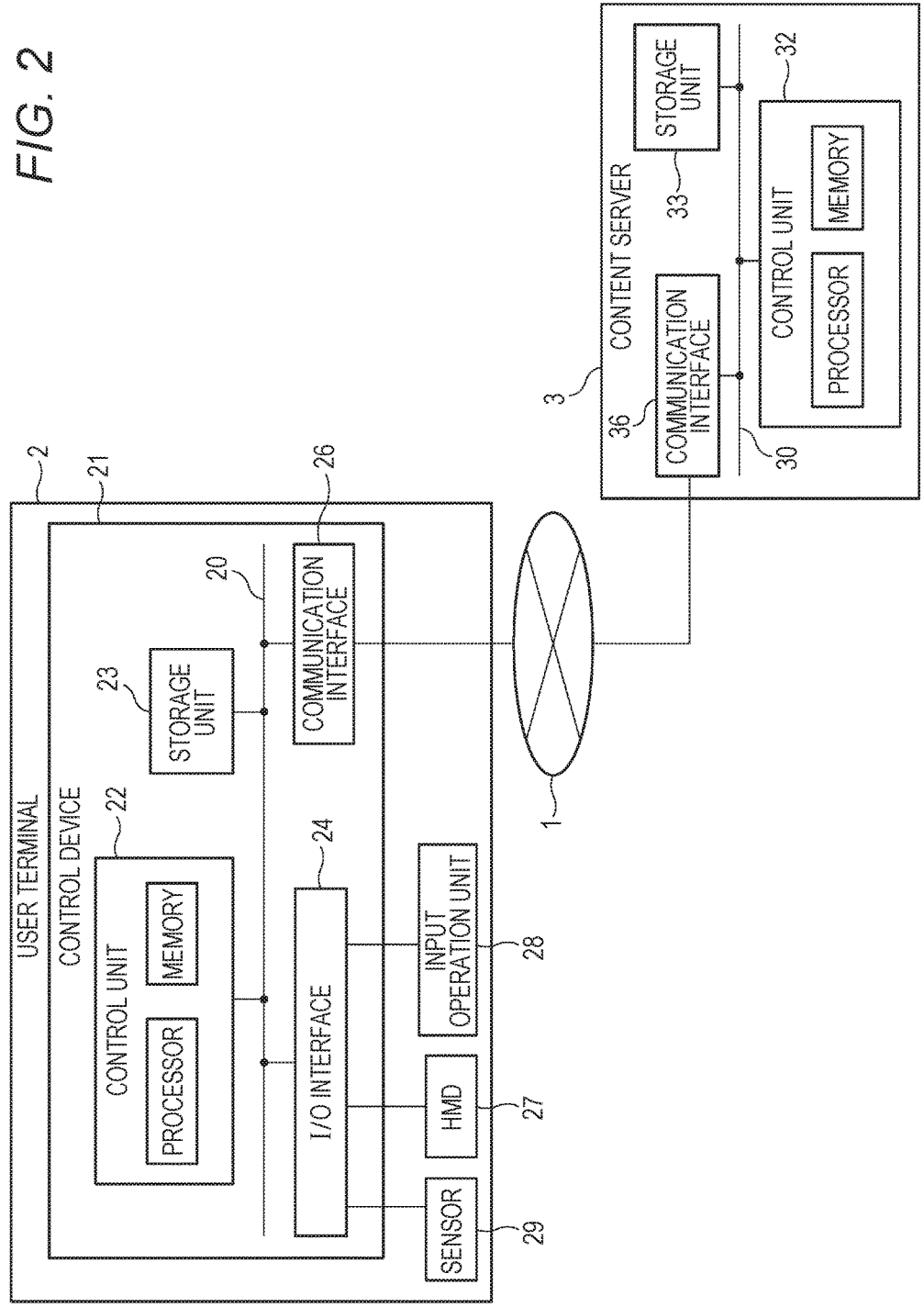
FIG. 2 is a diagram of a hardware configuration of a user terminal and a content server according to at least one embodiment.

A description is given next with reference to FIG. 2 for hardware configurations, according to at least one embodiment, of the user terminal 2 and the content server 3. The hardware configuration of the user terminal 2 is described first. In FIG. 2, the user terminal 2 includes a control device 21, an input operation unit 28, a head-mounted display (HMD) 27, and a sensor 29. The control device 21 includes a communication bus 20, a control unit 22, a storage unit 23, an input/output (I/O) interface 24, and a communication interface 26. The control unit 22, the storage unit 23, the I/O interface 24, and the communication interface 26 are connected to one another by the communication bus 20 to allow communication with one another. The control device 21 is, for example, a personal computer, a smartphone, a tablet, or a wearable device.

The control unit 22 includes a memory and a processor. The memory is constructed from, for example, a read-only memory (ROM) on which various programs are stored or a random access memory (RAM) that contains a plurality of work areas where various programs executed by the processor and data are stored. In at least one embodiment, the RAM includes a VRAM on which visual-field image data corresponding to a visual-field image to be displayed on the HMD 27 is stored. The processor is constructed from a central processing unit (CPU), a micro-processing unit (MPU), and/or a graphic processing unit (GPU).

The storage unit (storage) 23 is configured to store various programs and video data, among others, and is constructed from, for example, a hard disk drive (HDD), a solid state drive (SDD), or a universal serial bus (USB) flash memory. The I/O interface 24 is configured to connect the input operation unit 28, the HMD 27, and the sensor 29 to the control device 21 to facilitate communication between the input operation unit 28 and the control device 21, the HMD 27 and the control device 21, and the sensor 29 and the control device 21. The I/O interface 24 is constructed from, for example, a USB terminal or a high-definition multimedia interface (HDMI, a registered trademark).

The communication interface 26 is configured to connect the user terminal 2 to the communication network 1. The communication interface 26 includes various wired connection terminals for communication to and from an external device over the communication network 1, and various processing circuits for wireless connection, and is configured to conform to communication standards for communication over the communication network 1.

The input operation unit 28 is configured to receive input operation(s) performed on the user terminal 2 by a user, and to generate an operation signal that represents the user's input operation in response to the input operation. The input operation unit 28 is, for example, a touch panel, an external controller, a mouse, or a keyboard. The HMD 27 is configured to display a visual-field image based on visual-field image data. In particular, the HMD 27 displays a visual-field image for the left eye and a visual-field image for the right eye based on left-eye visual-field image data and right-eye visual-field image data, thereby providing the user with a three-dimensional image as a virtual reality (VR) image that utilizes a parallax between the left eye and the right eye.

The sensor 29 is configured to detect the movement of the user wearing the HMD 27 by detecting the movement of the HMD 27 in an X-direction, a Y-direction, and a Z-direction, and the rotation of the HMD 27 about an X-axis, a Y-axis, and a Z-axis. A change in line of sight caused by the movement of the user's head is detected in this manner. The sensor 29 may be constructed from a geomagnetic sensor, an acceleration sensor, and/or a gyro sensor that are provided in the HMD 27, or may be an external camera or other position sensor configured to detect a plurality of light emission points provided on the HMD 27.

The hardware components of the content server 3 are each described next. The content server 3 includes a communication bus 30, a control unit 32, a storage unit 33, and a communication interface 36. The control unit 32, the storage unit 33, and the communication interface 36 are connected to one another in a manner that allows communication among those components via the communication bus 30. The control unit 32 includes a memory and a processor. The memory is constructed from, for example, a ROM and a RAM. The processor is constructed from, for example, a CPU, an MPU, and/or a GPU.

The storage unit (storage) 33 is configured to store various programs and 360-degree space image data, among others, and is a large-capacity HDD or the like. The 360-degree space image data is generated by, for example, a 360-degree camera set up in a concert hall or a similar place. The communication interface 36 is configured to connect the content server 3 to the communication network 1.

Figure 3:
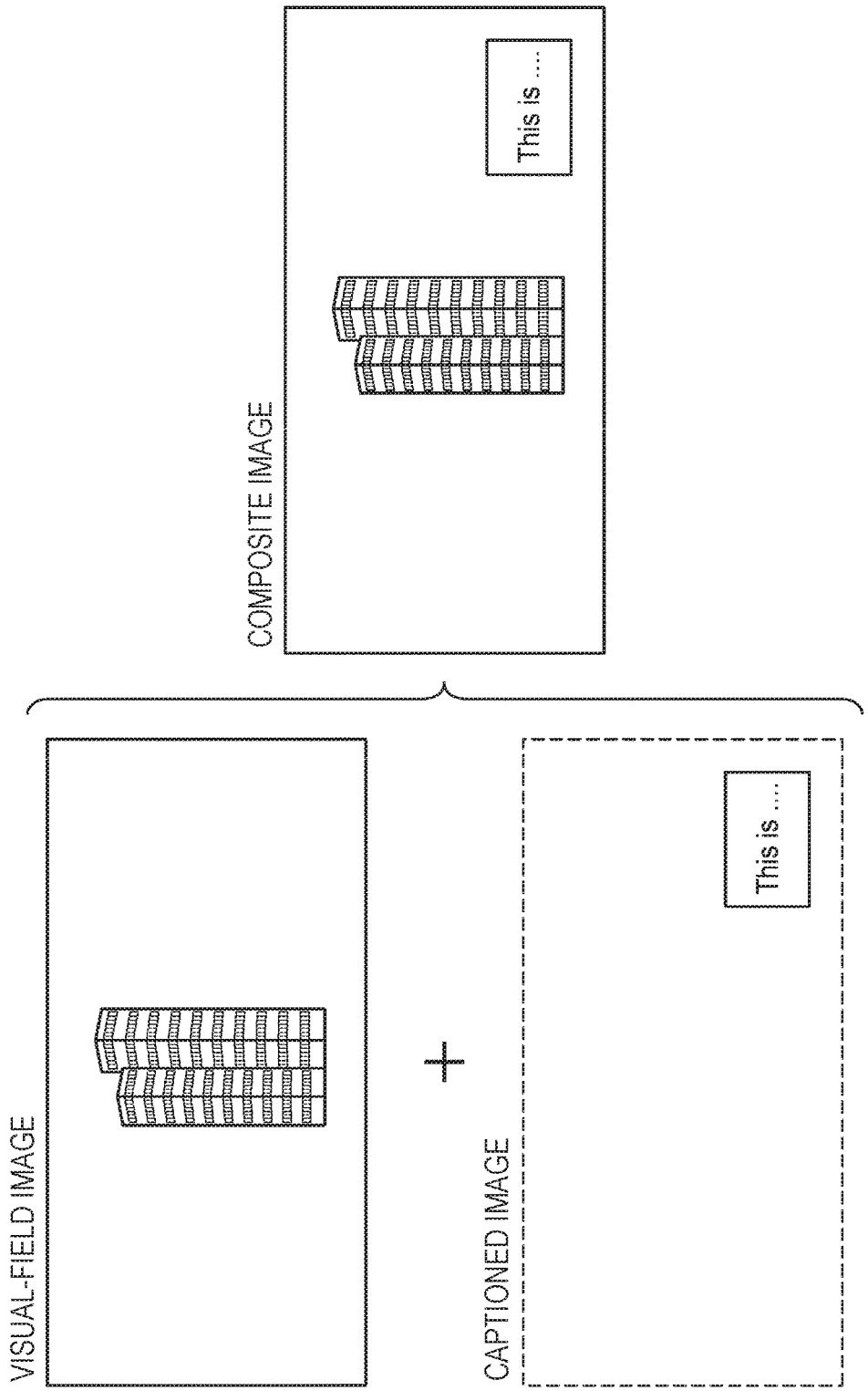
FIG. 3 is a diagram of an example of a visual-field image, a captioned image, and a composite image according to at least one embodiment.

An example of a composite image, according to at least one embodiment, obtained by compositing a visual-field image and a captioned image is described next with reference to FIG. 3. FIG. 3 is a diagram of an example of a visual-field image, a captioned image, and a composite image. "Image" described herein includes a moving image (video) obtained by switching still images in succession along a time axis. For instance, a composite image is displayed on the HMD 27 at a given frame rate.

A visual-field image is a virtual reality (VR) image displayed in the visual field of the user out of a 360-degree space image centered about the user's view point. In other words, a visual-field image is a part of a 360-degree space image centered about the user's view point, and is defined by the user's visual field. The visual field of the user is defined by the user's line-of-sight direction. In short, when the line-of-sight direction of the user is determined, the user's visual field is determined and the visual-field image is determined. Similarly, a change in the line-of-sight direction of the user changes the user's visual field, thereby changing the visual-field image. More specifically, a change in the line-of-sight direction of the user changes the sighting axis of a virtual camera placed in a virtual space where a 360-degree space image is displayed, thereby changing the visual field of the virtual camera. The visual-field image, which is generated based on the 360-degree space image and the visual field of the virtual camera, is changed when there is a change in the visual field of the virtual camera. The visual-field image thus changes along with changes in the line-of-sight direction of the user. Types of the visual-field image include, for example, video games, concert videos, videos of soccer, baseball, sumo, combat sports, tennis, and other sports, and videos of kabuki, noh, musicals, and other stage performances.

A captioned image contains at least one of text (a character or characters), an image (video), or a graphic form, and indicates some kind of information (artist information, information about baseball, soccer, or other sports, time information, subtitle information, news information, "wipe" (picture-in-picture), or the like). In FIG. 3, an area where the captioned image is displayed is smaller than an area where the visual-field image is displayed. The captioned image may be displayed at a given place in the visual-field image displayed on the HMD 27 (for example, near one of the four corners of the visual-field image). In at least one embodiment, the given place is predetermined based on information in storage 23 or storage 33. In at least one embodiment, the given place is selected based on a user preference stored in storage 23 or storage 33. The captioned image may instead move upward and downward in the visual-field image displayed on the HMD 27 in the manner of an end roll. As long as the captioned image does not cover the visual-field image display area completely, the display mode of the captioned image is not particularly limited. A location of the captioned image, unlike the visual-field image described above, does not change along with changes in the line-of-sight direction of the user. In at least one embodiment, a size, orientation, text or other content of the captioned image changes as the line-of-sight direction of the user changes.

Figure 4A:
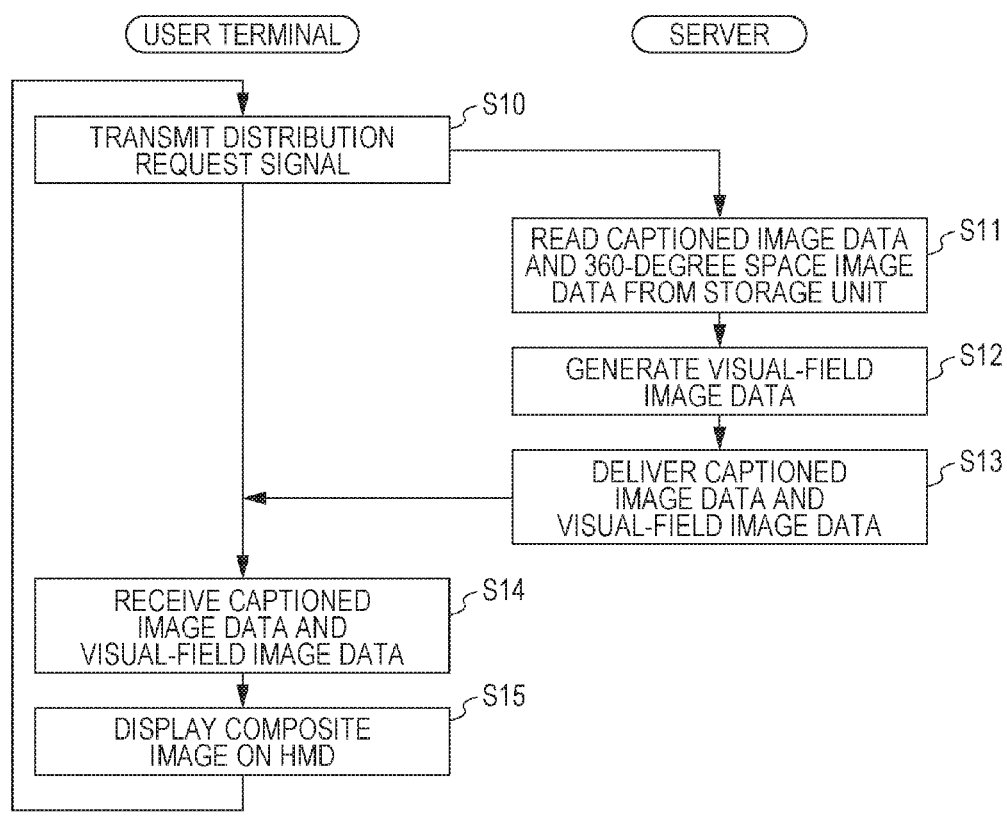
Figure 4B:
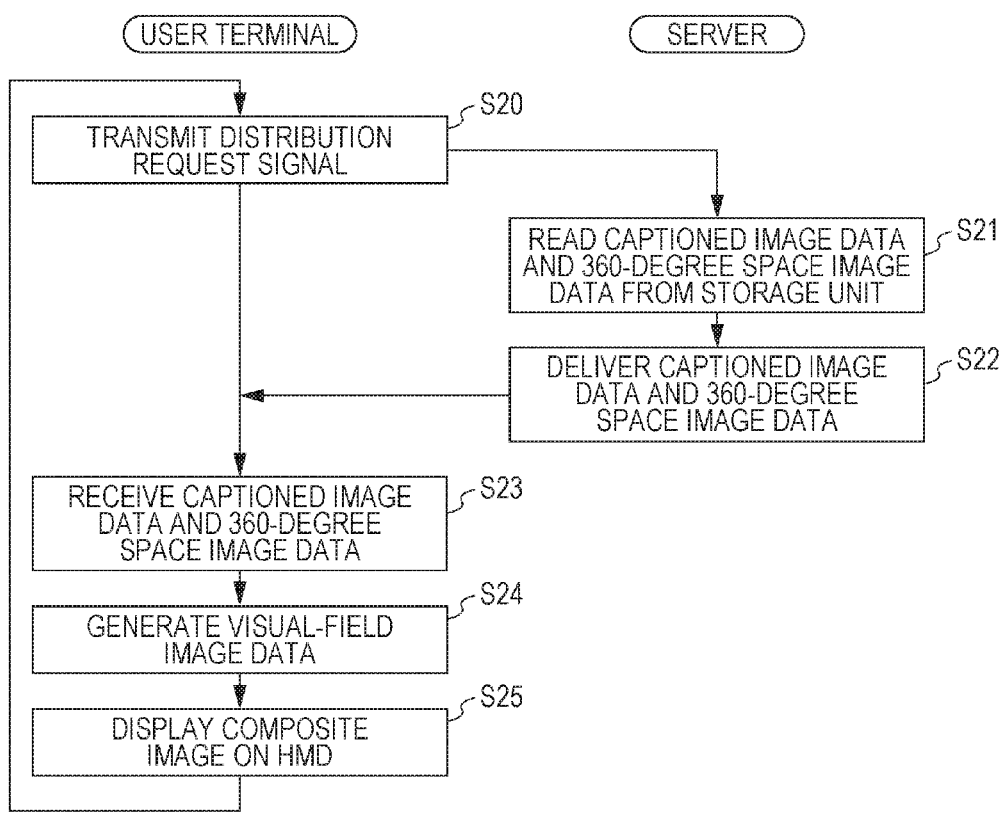

A display control method according to at least one embodiment of this disclosure is described below with reference to FIG. 4A and FIG. 4B and FIG. 5. FIG. 4A and FIG. 4B are flow charts of a display control method according to at least one embodiment. Specifically, FIG. 4A is a flow chart in the case where the content server 3 (hereinafter simply referred to as "server 3") delivers visual-field image data to the user terminal 2 in a streaming format. FIG. 4B is a flow chart in the case where the server 3 delivers 360-degree space image data to the user terminal 2 in a streaming format.

The display control method according to at least one embodiment is one that is executed when the server 3 delivers visual-field image data to the user terminal 2 in a streaming format. In FIG. 4A, the control unit 22 of the user terminal 2 generates, in Step S10, a distribution request signal that represents a request to deliver visual-field image data V1 and captioned image data TR1, in response to an operation signal generated by the user's input to the input operation unit 28, and transmits the generated distribution request signal to the server 3 via the communication interface 26 and the communication network 1. In FIG. 5, the visual-field image data V1 is a piece of the whole visual-field image data that is created by time division and that corresponds to a first period. The captioned image data TR1 is a piece of the whole captioned image that is created by time division and that corresponds to the first period. The server 3 thus delivers apiece of visual-field image data and a piece of captioned image data that are created by time division in a streaming format. The control unit 22 transmits, to the server 3, ID information of the user who is using the user terminal 2, address information (an IP address) of the user terminal 2, line-of-sight direction information, which indicates the user's line-of-sight direction, and address information (an IP address) of the server 3, along with the distribution request signal.

The generation of the line-of-sight direction information is described. First, the sensor 29 detects the movement of the HMD 27 and transmits data that indicates the movement of the HMD 27 to the control unit 22. The control unit 22 next obtains information about the movement (position and tilt) of the HMD 27 based on the data transmitted from the sensor 29. The control unit 22 then generates the line-of-sight direction information, which indicates the user's line-of-sight direction, based on the obtained information. The line-of-sight direction information is generated by the control unit 22 in this manner. The control unit 22 is configured to update the line-of-sight direction information each time the HMD 27 moves.

Next, the control unit 32 of the server 3 reads the captioned image data TR1 and 360-degree space image data VS1, which corresponds to the first period, out of the storage unit 33 in response to the distribution request signal transmitted from the user terminal 2 via the communication interface 36 (Step S11). The control unit 32 next generates the visual-field image data V1 from the 360-degree space image data VS1 and from the line-of-sight direction information (Step S12). The control unit 32 then delivers the captioned image data TR1 and the visual-field image data V1 to the user terminal 2 by referring to the address information of the user terminal 2 (Step S13).

Next, the control unit 22 of the user terminal 2 receives the captioned image data TR1 and the visual-field image data V1 from the server 3 via the communication network 1 and the communication interface 26 (Step S14). The control unit 22 then displays on the HMD 27 a composite image C1, which is a composite of a visual-field image and a captioned image, based on the visual-field image data V1 and the captioned image data TR1 (Step S15). Specifically, the control unit 22 provides instructions for displaying the composite image C1 on the HMD 27 by synchronizing a play start time of the visual-field image (the visual-field image data V1) and a play start time of the captioned image (the captioned image data TR1) as illustrated in FIG. 5. In a period where the captioned image is not displayed in the composite image C1, the visual-field image alone is displayed on the HMD 27, whereas the visual-field image and the captioned image are both displayed on the HMD 27 in a period where the captioned image is displayed. Next, while the composite image C1 is being displayed on the HMD 27, the control unit 22 generates a distribution request signal that represents a request to deliver visual-field image data V2, which corresponds to a second period, and captioned image data TR2, which corresponds to the second period, and transmits the generated distribution request signal to the server 3 (Step S10). Steps S11 to S14 are subsequently executed. Thereafter, the control unit 22 displays a composite image C2 on the HMD 27 by synchronizing the play start time of the visual-field image (the visual-field image data V2) and the play start time of the captioned image (the captioned image data TR2) (Step S15). The composite images C1, C2, C3 . . . are displayed on the HMD 27 in this manner.

The display control method according to at least one embodiment that is described next is one that is executed when the server 3 delivers 360-degree space image data to the user terminal 2 in a streaming format. In FIG. 4B, the control unit 22 generates, in Step S20, a distribution request signal that represents a request to deliver the 360-degree space image data VS1 and the captioned image data TR1 in response to an operation signal generated by the user's input to the input operation unit 28, and transmits the generated distribution request signal to the server 3 via the communication interface 26 and the communication network 1. The 360-degree space image data VS1 is a piece of the whole 360-degree space image data that is created by time division and that corresponds to the first period, and includes the visual-field image data V1. The control unit 22 transmits, to the server 3, ID information of the user, address information of the user terminal 2, and address information (an IP address) of the server 3, along with the distribution request signal.

Next, the control unit 32 reads the captioned image data TR1 and the 360-degree space image data VS1 from the storage unit 33 in response to the distribution request signal transmitted from the user terminal 2 via the communication interface 36 (Step S21), and delivers the captioned image data TR1 and the 360-degree space image data VS1 to the user terminal 2 by referring to the address information of the user terminal 2 (Step S22).

Thereafter, the control unit 22 receives the captioned image data TR1 and the 360-degree space image data VS1 from the server 3 via the communication network 1 and the communication interface 26 (Step S23). The control unit 22 next generates the visual-field image data V1 based on the 360-degree space image data and the line-of-sight direction information (Step S24), and provides instructions for displaying on the HMD 27 the composite image C1, which is a composite of a visual-field image and a captioned image, based on the visual-field image data V1 and the captioned image data TR1 (Step S25). The composite image C1 is generated by the method described above with reference to FIG. 4A.

According to at least one embodiment, a composite image is displayed on the HMD 27 so that a captioned image is displayed at a given place in a visual-field image, irrespective of a change in the line-of-sight direction of the user. A display control method capable of displaying a captioned image in the user's visual field irrespective of a change in the user's line-of-sight direction can be provided in this manner. The visual-field image data, which is generated based on the line-of-sight direction information and the 360-degree space image data, in particular, is updated each time the HMD 27 moves and the line-of-sight direction information is accordingly updated. The captioned image, on the other hand, is displayed at a given place in the visual-field image independently of the line-of-sight direction information.

According to at least one embodiment, where a composite image is displayed on the HMD 27 by synchronizing the play start time of the visual-field image data and the play start time of the captioned image data, displaying a captioned image in a visual-field image is accomplished by a relatively simple principle.

In the display control method of FIG. 4A, instead of the 360-degree space image data, which is large in data size, the server 3 delivers the visual-field image data to the user terminal 2. As a result, the load of communication between the server 3 and the user terminal 2 is reduced.

In the display control method illustrated in FIG. 4B, the user terminal 2 generates the visual-field image data, which eliminates or reduces receiving the visual-field image data from the server 3 every time there is a change in the line-of-sight direction of the user. The method of FIG. 4B is thus advantageous when the user's line-of-sight direction changes frequently.

Figure 6B:
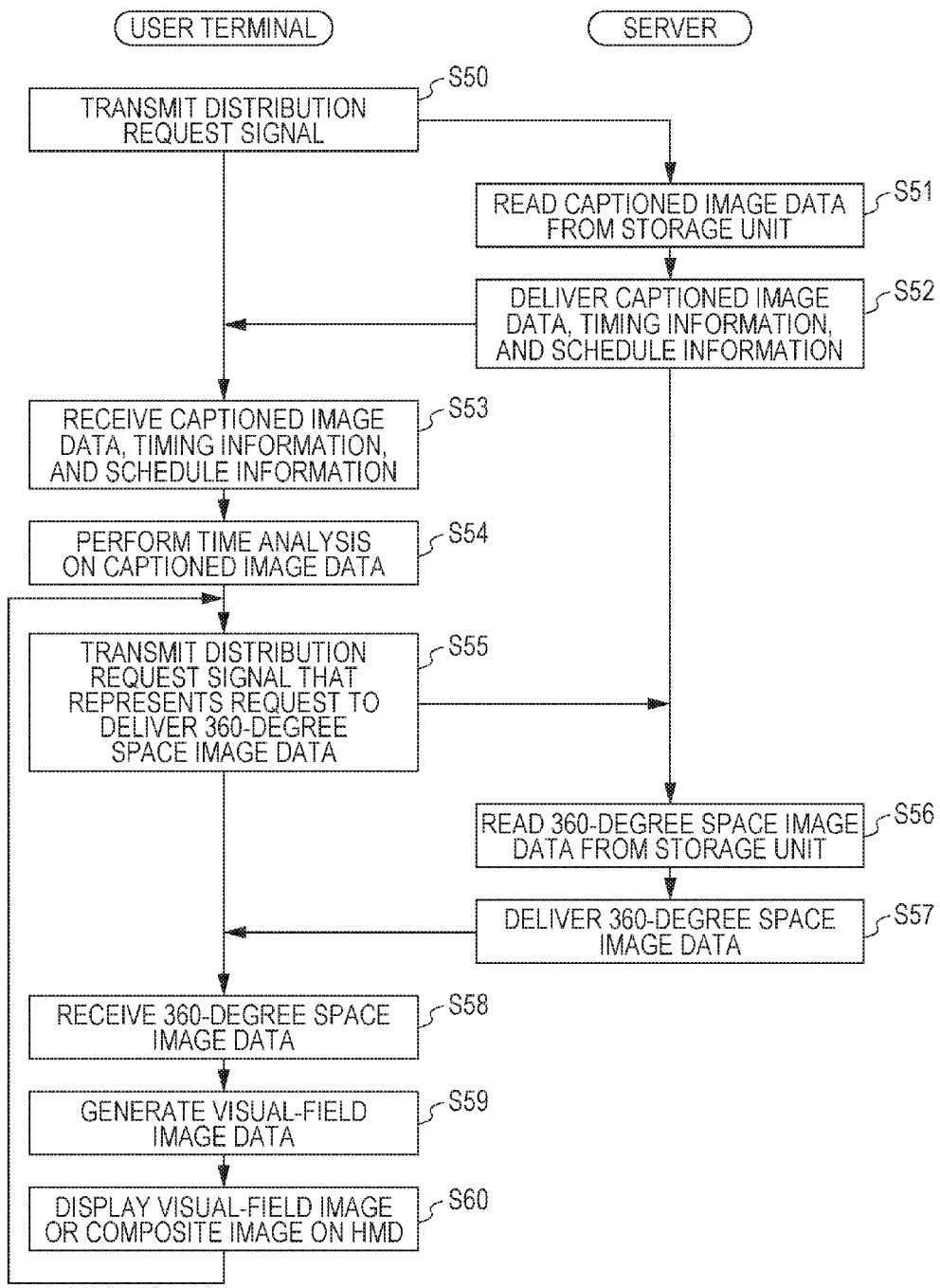

A display control method according to at least one embodiment of this disclosure is described below with reference to FIG. 6A and FIG. 6B and FIG. 7. FIG. 6A and FIG. 6B are flow charts of a display control method according to at least one embodiment. FIG. 6A is a flow chart in the case where the server 3 delivers visual-field image data to the user terminal 2 in a streaming format. FIG. 6B is a flow chart in the case where the server 3 delivers 360-degree space image data to the user terminal 2 in a streaming format. FIG. 7 is a timing chart for illustrating the display control method according to at least one embodiment.

The display control method according to at least one embodiment that is described first is one that is executed when the server 3 delivers the visual-field image data to the user terminal 2 in a streaming format. In FIG. 6A, the control unit 22 generates, in Step S30, a distribution request signal that represents a request to deliver all pieces of the captioned image data, the timing information, and the schedule information in response to an operation signal generated by the user's input to the input operation unit 28, and transmits the generated distribution request signal to the server 3 via the communication interface 26 and the communication network 1. "All pieces of the captioned image data" means all pieces of captioned image data that are obtained to view video content. The captioned image data may be 360-degree space captioned image data centered about the user's point of view. The timing information indicates when to display a captioned image in a visual-field image. In FIG. 7, the timing information includes, for example, information about start times t1, t3, and t5 at which displaying the captioned image data TR1, the captioned image data TR2, and the captioned image data TR3 is started, and end times t2, t4, and t6 at which displaying the captioned image data TR1, the captioned image data TR2, and the captioned image data TR3 is ended. A composite image C1 is generated by compositing the captioned image data TR1 and visual-field image data V1, which corresponds to the first period. A composite image C2 is generated by combining the captioned image data TR2 and visual-field image data V2, which corresponds to the second period. A composite image C3 is generated by combining the captioned image data TR3 and visual-field image data V3, which corresponds to a third period.

The schedule information indicates, for each of the visual-field image data V1, the visual-field image data V2, the visual-field image data V3 . . . created by time division, a time to start receiving the visual-field image data. In at least one embodiment, the visual-field image data includes more than three segments. The control unit 22 transmits, to the server 3, ID information of the user who is using the user terminal 2, address information (an IP address) of the user terminal 2, line-of-sight direction information, which indicates the user's line-of-sight direction, and address information (an IP address) of the server 3, along with the distribution request signal.

Next, the control unit 32 reads all of the pieces of the captioned image data, the timing information, and the schedule information from the storage unit 33 in response to the distribution request signal transmitted from the user terminal 2 via the communication interface 36 (Step S31). The control unit 32 then delivers all of the pieces of the captioned image data, the timing information, and the schedule information to the user terminal 2 by referring to the address information of the user terminal 2 (Step S32).

Next, the control unit 22 receives the captioned image data, the timing information, and the schedule information via the communication network 1 and the communication interface 26 (Step S33). The control unit 22 then performs time analysis on the captioned image data (Step S34). For example, the control unit 22 may obtain, for each still image (each frame) of the captioned image data, a display time at which the still image is displayed, through performing the time analysis on the captioned image data. In the case where the captioned image data received from the server 3 is 360-degree space captioned image data, the control unit 22 may generate captioned visual-field image data based on the received 360-degree space captioned image data and a given visual field that is defined by a virtual camera. Herein, the virtual camera is placed in a virtual space where a 360-degree space captioned image is displayed. The given visual field of the virtual camera does not change along with changes in the line-of-sight direction of the user, and is determined in advance.

Next, the control unit 22 refers to the transmitted schedule information to generate a distribution request signal that represents a request to deliver the visual-field image data V1, which corresponds to the first period, and transmits the generated distribution request signal to the server 3 (Step S35). Thereafter, the control unit 32 reads the 360-degree space image data VS1, which corresponds to the first period, from the storage unit 33 in response to the distribution request signal transmitted from the user terminal 2 via the communication interface 36 (Step S36). The control unit 32 next generates the visual-field image data V1 from the 360-degree space image data VS1 and the line-of-sight direction information (Step S37), and transmits the visual-field image data V1 to the user terminal 2 by referring to the address information of the user terminal 2 (Step S38).

Next, the control unit 22 receives the visual-field image data V1 from the server 3 via the communication network 1 and the communication interface 26 (Step S39). In Step S40, the control unit 22 displays on the HMD 27 a visual-field image based on the visual-field image data V1 until the play time reaches the time t1. In a period between the time t1 and the time t2, the control unit 22 displays on the HMD 27 the composite image C1, which is a composite of the visual-field image and a relevant captioned image, based on the timing information, the visual-field image data V1, and the captioned image data TR1. After the play time exceeds the time t2, the control unit 22 displays the visual-field image on the HMD 27.

While the composite image C1 or the visual-field image represented by the visual-field image data V1 is being displayed on the HMD 27, the control unit 22 generates a distribution request signal that represents a request to deliver the visual-field image data V2, which corresponds to the second period, and transmits the generated distribution request signal to the server 3 (Step S35). Steps S36 to S39 are subsequently executed. Thereafter, the control unit 22 generates instructions for displaying a visual-field image represented by the visual-field image data V2, or the composite image C2, on the HMD 27 (Step S40). The composite images C1, C2, C3 . . . are displayed on the HMD 27 in this manner.

The display control method according to at least one embodiment that is described next is one that is executed when the server 3 delivers 360-degree space image data to the user terminal 2 in a streaming format. Steps S50 to S54 illustrated in FIG. 6B are substantially the same as Steps S30 to S34 illustrated in FIG. 6A, and a description thereof is omitted. The schedule information indicates, for each of 360-degree space image data VS1, 360-degree space image data VS2, and 360-degree space image data VS3 . . . created by time division, a time to start receiving the 360-degree space image data.

In Step S55, the control unit 22 refers to the transmitted schedule information to generate a distribution request signal that represents a request to deliver the 360-degree space image data VS1, which corresponds to the first period, and transmits the generated distribution request signal to the server 3. Thereafter, the control unit 32 reads the 360-degree space image data VS1 corresponding to the first period from the storage unit 33, in response to the distribution request signal transmitted from the user terminal 2 via the communication interface 36 (Step S56). The control unit 32 then delivers the 360-degree space image data VS1 to the user terminal 2 by referring to the address information of the user terminal 2 (Step S57).

Next, the control unit 22 receives the 360-degree space image data VS1 from the server 3 via the communication network 1 and the communication interface 26 (Step S58), and generates the visual-field image data V1 based on the 360-degree space image data VS1 and the line-of-sight direction information (Step S59). To give a specific description on Step S59, the control unit 22 first determines the visual axis of a virtual camera in a virtual space where a 360-degree space image is displayed, based on the line-of-sight direction information. The control unit 22 next determines the visual field of the virtual camera based on the determined visual axis of the virtual camera to generate the visual-field image data V1 based on the 360-degree space image data VS1 and the determined visual field of the virtual camera. The visual-field image data V1 thus changes along with changes in the line-of-sight direction of the user.

In Step S60, the control unit 22 generates instructions for displaying on the HMD 27 a visual-field image based on the visual-field image data V1 until the play time reaches the time t1. In a period between the time t1 and the time t2, the control unit 22 displays on the HMD 27 the composite image C1, which is a composite of the visual-field image and a relevant captioned image, based on the timing information, the visual-field image data V1, and the captioned image data TR1. After the play time exceeds the time t2, the control unit 22 displays the visual-field image on the HMD 27.

While the composite image C1 or the visual-field image represented by the visual-field image data V1 is being displayed on the HMD 27, the control unit 22 generates a distribution request signal that represents a request to deliver the 360-degree space image data VS2, which corresponds to the second period, and transmits the generated distribution request signal to the server 3 (Step S55). Steps S56 to S59 are subsequently executed. Thereafter, the control unit 22 displays a visual-field image represented by the visual-field image data V2, or the composite image C2, on the HMD 27 (Step S60). The composite images C1, C2, C3 . . . are displayed on the HMD 27 in this manner.

According to at least one embodiment, a composite image is displayed on the HMD 27 by compositing a visual-field image, which changes along with changes in the line-of-sight direction of the user, and a captioned image, which does not change along with changes in the line-of-sight direction of the user. Displaying the captioned image at a given place in the visual-field image irrespective of a change in the user's line-of-sight direction is thus accomplished.

According to at least one embodiment, visual-field image data or 360-degree space image data is received based on the schedule information, and a composite image is displayed on the HMD 27 based on the timing information, the schedule information, the visual-field image data, and the captioned image data. Displaying a captioned image in a visual-field image at proper timing is thus accomplished with ease.

In at least one embodiment, each of the pieces of visual-field image data, or pieces of 360-degree space image data, that are created by time division are received based on the schedule information. However, each of the pieces of visual-field image data, or the pieces of 360-degree space image data, that are created by time division may be received without referring to the schedule information.

As described above, all pieces of captioned image data, the total size of which is smaller in data size than visual-field image data (or 360-degree space image data), are downloaded first in at least one embodiment. In at least one embodiment, individual pieces of captioned image data are downloaded if the a size of the individual pieces of captioned image data are large, e.g., rich video data. The captioned image data then undergoes an analysis of time information before the visual-field image data (or the 360-degree space image data) is downloaded in a streaming format. This helps to simplify synchronizing the time of the visual-field image data and the time of the captioned image data.

In order to achieve various types of processing to be executed by the control unit 22 with use of software, a display control program for causing a computer (processor) to execute a display control method according to this embodiment may be installed in advance into the storage unit 23 of the control device 21 or the ROM. Alternatively, the display control program may be stored in a computer-readable storage medium, for example, a magnetic disk (HDD, a floppy disk), an optical disc (for example, CD-ROM, DVD-ROM, and Blu-ray disc), a magneto-optical disk (for example, MO), and a flash memory (for example, an SD card, a USB memory, and an SSD). In this case, the storage medium is connected to the control device 21, and thus the display control program stored in the storage medium is installed into the storage unit 23. Then, the display control program installed in the storage unit 23 is loaded onto the RAM, and the processor executes the loaded program. In this manner, the control unit 22 executes the display control method of at least one embodiment.

A part of the display control program (for example, a program for generating visual-field image data), for execution by the display control system, may be installed into the storage unit 33 of the content server 3. In this case, the part of the display control program that is installed into the storage unit 33 is loaded onto the RAM, and the processor executes the loaded program, thereby enabling the control unit 32 to execute apart of the display control method according to this embodiment.

The display control program may be downloaded from a computer on the communication network 1 via the communication interface 26. In this case also, the downloaded program is installed into the storage unit 33. Further, a part of the display control program may be downloaded from a computer on the communication network 1 via the communication interface 36. Also in this case, the downloaded program is similarly installed into the storage unit 33.

The description of some of the embodiments does not restrict the interpretation of the technical scope of this disclosure. The described embodiments are merely given as an example, and a person skilled in the art would understand that various modifications can be made to the embodiment within the scope of this disclosure set forth in the appended claims. Thus, the technical scope of this disclosure is to be defined based on the scope of this disclosure set forth in the appended claims and an equivalent scope thereof.

What is claimed is:

1. A display control method, comprising:
   generating visual-field image data, which represents a visual-field image, based on a line-of-sight direction of a user and 360-degree space image data;
   receiving captioned image data, which represents a captioned image, wherein the receiving of the captioned image data occurs prior to the generating of the visual-field image data;

transmitting a request to deliver the visual-field image data, wherein the transmitting the request to deliver the visual-field image data occurs after the receiving of the captioned image data; and displaying, on a head-mounted display (HMD), a composite image that is a composite of the visual-field image and the captioned image, based on the visual-field image data and the captioned image data, wherein displaying the composite image comprises:

synchronizing a play start time of the visual-field image and a play start time of the captioned image, wherein the play start time of the visual-field image and the play start time of the captioned image are based on a time the HMD starts receiving the visual-filed image data; and displaying the captioned image at a given place in the visual-field image irrespective of a change in the line-of-sight direction of the user.

2. The display control method according to claim 1, further comprising receiving the 360-degree space image data from the server, wherein generating the visual-field image date comprises generating the visual-field image data using a user terminal.

3. The display control method according to claim 1, further comprising a step of receiving the visual field image data from the server, wherein generating the visual-field image data comprises generating the visual-field image data using the server.

4. The control method according to claim 1, wherein the 360-degree space data includes the visual-field image, and a change in the line-of-sight direction of the user changes the visual-field image.

5. The display control method according to claim 1, further comprising receiving image data, wherein the generating the visual-field image data comprises generating the visual field image data based on the received image data.

6. The display control method, comprising:

generating visual-field image data, which represents a visual-field image, based on a line-of-sight direction of a user and 360-degree space image data;

receiving captioned image data that represents a captioned image, timing information that indicates when to display the captioned image in the visual-field image, and schedule information that indicates a time to start receiving each piece of the visual-field image data or each piece of the 360-degree space image data created by time division, wherein receiving the captioned image data occurs prior to generating the visual-field image data, and receiving the captioned image data comprises receiving all pieces of the captioned image data at one time;

transmitting a request to deliver the visual-field image data, wherein the transmitting the request to deliver the visual-field image data occurs after the receiving of the captioned image data; and displaying on a head-mounted display (HMD) a composite image that is a composite of the visual-field image and the captioned image based on the timing information, the schedule information, the visual-field image data, and the captioned image data, wherein displaying the composite image comprises displaying the composite image so that the captioned image is displayed at a given place in the visual-field image irrespective of a change in the line-of-sight direction of the user;

synchronizing a play start time of the visual-field image and a play start time of the captioned image, wherein the play start time of the visual-field image and the play start time of the captioned image are based on a time the HMD starts receiving the visual-filed image data; and the display control method further comprises one of:

receiving each of the pieces of the 360-degree space image data that is created by time division from a server based on the schedule information; or receiving each of the pieces of the visual-field image data that is created by time division from the server based on the schedule information.

7. The display control method according to claim 6, wherein the method comprises receiving each of the pieces of the 360-degree space image data that is created by time division from the server based on the schedule information, and wherein generating the visual-field image data comprises generating the visual-field image data using a user terminal.

8. The display control method according to claim 6, wherein generating the visual-field image data comprises generating the visual-field image data using the server, and the display control method comprises the step of receiving each of the pieces of the visual-field image data that are created by time division from the server based on the schedule information.

9. A system for executing a display control method, the system comprising:

at least one processor; and a non-transitory computer readable medium for storing instructions connected to the at least one processor, wherein the at least one processor is configured to execute the instructions for:

generating visual-field image data, which represents a visual-field image, based on a line-of-sight direction of a user and 360-degree space image data;

receiving captioned image data, which represents a captioned image, and the captioned image includes a first time period for displaying information and a second time period for not displaying the information, wherein the receiving of the captioned image data occurs prior to the generating of the visual-field image data;

transmitting a request to deliver the visual-field image data, wherein the transmitting the request to deliver the visual-field image data occurs after the receiving of the captioned image data; and generating instructions for displaying, on a head-mounted display (HMD), a composite image that is a composite of the visual-field image and the captioned image, based on the visual-field image data and the captioned image data, wherein generating instructions for displaying the composite image comprises:

synchronizing a play start time of the visual-field image and a play start time of the captioned image; and displaying the captioned image at a given place in the visual-field image irrespective of a change in the line-of-sight direction of the user.

10. The system according to claim 9, wherein a first processor of the at least one processor is further configured to execute the instructions for receiving the 360-degree space image data from the server, and the first processor is located in a user terminal.

11. The system according to claim 9, wherein a first process of the at least one processor is further configured to execute the instructions for receiving the visual field image data from the server, a second processor of the at least one processor is configured to execute the instructions for generating the visual-field image data, and the second processor is located in the server.

12. The system according to claim 9, wherein the 360-degree space data includes the visual-field image, and a change in the line-of-sight direction of the user changes the visual-field image.

13. The system according to claim 9, wherein the processor is configured to receive image data, and to generate the visual-field image data based on the received image data.

* * * * *